(12) United States Patent
Blanchard et al.

(10) Patent No.: US 11,506,258 B2
(45) Date of Patent: Nov. 22, 2022

(54) CHAIN LINK

(71) Applicants: Kenneth Blanchard, Sanford, MI (US); Terry Duperon, Saginaw, MI (US); Bryce Funchion, Tecumseh, MI (US)

(72) Inventors: Kenneth Blanchard, Sanford, MI (US); Terry Duperon, Saginaw, MI (US); Bryce Funchion, Tecumseh, MI (US)

(73) Assignee: Duperon Innovation LLC, Saginaw, MI (US)

( * ) Notice: Subject to any disclaimer, the term of this patent is extended or adjusted under 35 U.S.C. 154(b) by 739 days.

(21) Appl. No.: 16/509,968

(22) Filed: Jul. 12, 2019

(65) Prior Publication Data

US 2021/0010562 A1 Jan. 14, 2021

(51) Int. Cl.
*F16G 13/18* (2006.01)
*F16G 15/12* (2006.01)

(52) U.S. Cl.
CPC ............. *F16G 13/18* (2013.01); *F16G 15/12* (2013.01)

(58) Field of Classification Search
CPC .......... F16G 13/02; F16G 13/07; F16G 13/06; F16G 13/18
USPC .......................................................... 474/232
See application file for complete search history.

(56) References Cited

U.S. PATENT DOCUMENTS

| | | | | |
|---|---|---|---|---|
| 36,300 A * | 8/1862 | Hayden | ................... | F16G 13/02 474/232 |
| 542,952 A * | 7/1895 | Whiteley | ................. | F16G 13/02 474/219 |
| 615,203 A * | 11/1898 | Woodcock | .............. | F16G 13/06 474/228 |
| 1,308,843 A * | 7/1919 | Davis | ...................... | F16G 13/07 474/234 |
| 1,402,766 A * | 1/1922 | Hay | ........................ | F16G 13/07 474/219 |
| 1,404,842 A * | 1/1922 | Elsinger | .................. | F16G 13/02 474/208 |
| 2,049,254 A * | 7/1936 | Gerber | ..................... | C23G 3/04 474/232 |
| 2,129,407 A * | 9/1938 | Dalrymple | ............. | F16G 13/06 59/8 |
| 3,231,069 A * | 1/1966 | Lanham | ................... | F16G 13/07 198/853 |
| 3,841,169 A * | 10/1974 | Bisewski | ................ | F16G 13/06 474/231 |
| 3,948,114 A * | 4/1976 | Koinzan | ................... | F16H 7/08 474/101 |
| 4,710,153 A * | 12/1987 | Allert | ...................... | F16G 13/07 474/232 |
| 4,815,270 A * | 3/1989 | Lapeyre | .................... | F16G 5/18 59/900 |
| 5,192,251 A * | 3/1993 | Tuomikoski | ............ | F16G 13/02 474/232 |
| 5,445,569 A * | 8/1995 | Blase | ...................... | F16G 13/16 474/227 |
| 5,938,553 A * | 8/1999 | Ishida | ..................... | F16G 13/06 474/212 |
| 6,138,820 A * | 10/2000 | Ewert | ..................... | F16G 13/07 198/850 |
| 6,308,510 B1 * | 10/2001 | Christmas | ............... | F16G 13/06 59/84 |

(Continued)

*Primary Examiner* — Henry Y Liu

(57) ABSTRACT

Novel chain links that are used in combination with essentially identical chain links to form a chain that is useful in flex rake apparati for use in cleaning water streams.

28 Claims, 7 Drawing Sheets

(56) References Cited

U.S. PATENT DOCUMENTS

| | | | | |
|---|---|---|---|---|
| 6,443,795 B1* | 9/2002 | Lin | ............... | A63H 33/042 |
| | | | | 474/232 |
| 8,069,645 B2* | 12/2011 | Mackert | ............ | A47C 7/40 |
| | | | | 403/103 |
| 9,707,496 B2 | 7/2017 | Duperon et al. | | |
| 10,774,904 B1* | 9/2020 | Hussen | ............ | F16G 13/06 |
| 2005/0049099 A1* | 3/2005 | Morishige | ......... | F16G 13/18 |
| | | | | 474/227 |
| 2005/0070389 A1* | 3/2005 | Morishige | ......... | F16G 13/04 |
| | | | | 474/212 |
| 2005/0090346 A1* | 4/2005 | Foster | ............... | F16H 7/18 |
| | | | | 474/140 |
| 2009/0124445 A1* | 5/2009 | Morishige | ......... | F16G 13/18 |
| | | | | 474/208 |
| 2011/0203248 A1* | 8/2011 | Mackert | ............ | A47C 7/40 |
| | | | | 59/84 |
| 2012/0311990 A1* | 12/2012 | Dunham | ............ | F16G 13/16 |
| | | | | 59/93 |
| 2014/0113758 A1* | 4/2014 | Huang | ............. | F16G 13/07 |
| | | | | 474/212 |
| 2019/0383365 A1* | 12/2019 | Clopet | ............... | F16H 9/24 |

\* cited by examiner

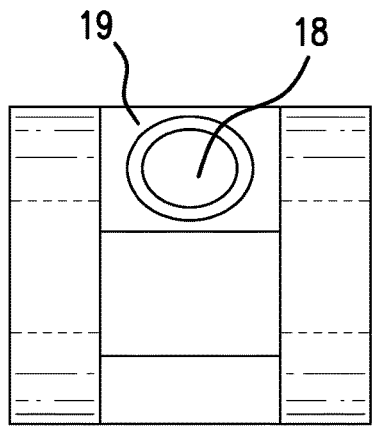
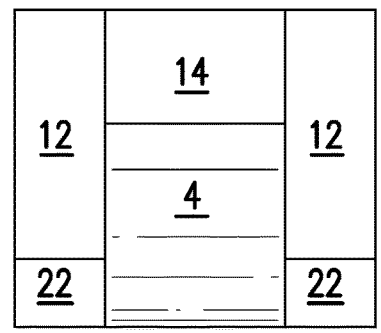
FIG. 4   FIG. 5
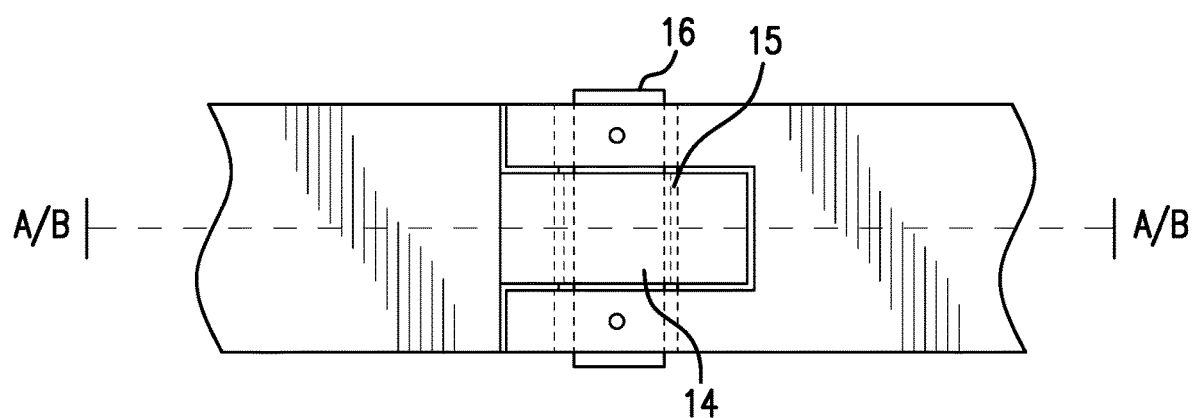
FIG. 6

CHAIN LINK

This invention deals with novel chain links that are used in combination with essentially identical chain links to form a chain that is useful in flex rake apparati for use in cleaning water streams.

BACKGROUND OF THE INVENTION

The chain links of this invention are useful for manufacturing chains that are useful in water management equipment such as that found in U.S. Pat. No. 9,707,496.

The chain link system that is provided by the unique chain links of this invention are load bearing. Some of the inventive links will flex in both directions, which is not a property of any chain link found in use today. In the normal direction, they will flex unrestricted because of their unique configuration. In the opposite direction that is not normally associated with the use of these chains, and with a load applied, they will flex up to four degrees past a parallel using a plug as a load bearing spring, the plug being described in detail infra.

The applicant is not aware of any chain links of this kind in the prior art.

THE INVENTION

Thus, what is disclosed and claimed in this specification are novel chain links. In one embodiment, the chain links comprise a unitary metal bar having a top, a first end, a second end, a tang space, and a center point.

The chain link first end is a clevis, wherein the clevis has through openings through the prongs of the clevis which openings have a predetermined size.

The tang opening has a back wall. The back wall has a beveled surface and has an insert opening in it. The chain link second end has a centered prong, the centered prong having a predetermined size second through opening in it. The centered prong is configured to fit the clevis first end on an adjoining chain link.

The chain link second end has an integrally mounted prow at a terminating end and there is an insert plug, insertable in the insert opening.

There is an another embodiment which is a one way flex chain link. The one way flex chain link comprises a unitary metal bar having a top, a first end, a second end, a tang space, a center point, and at least one elongated opening through a side of the unitary metal bar.

The chain link first end is a clevis, the clevis having a through opening through the prongs of the clevis. The openings have a predetermined size.

The tang opening has a back wall and the back wall has a beveled surface and has an insert opening in it. The chain link second end has a centered prong, the centered prong having a predetermined second through opening in it. The centered prong is configured to fit a clevis first end on an adjoining chain link. The chain link second end has an integrally mounted prow at a terminating end.

There is an insert plug, insertable in the insert opening and a lateral slit in the top of the unitary metal bar, from the top through into the elongated opening in the side of the unitary metal bar.

In yet another embodiment of this invention there is a two way flex chain link, the two way flex chain link comprising a unitary metal bar being a replaceable spring member flexible in two directions, having a top, a first end, a second end, a tang space, a center point.

The chain link first end is a clevis, the clevis having a through opening through the prongs of the clevis, the opening having a predetermined size.

The tang opening has a back wall, the back wall being beveled and having an insert opening in it. The chain link second end has a centered prong, the centered prong having a predetermined second through opening in it. The centered prong is configured to fit a clevis first end on an adjoining chain link.

The chain link second end has an integrally mounted prow at a terminating end. There is an insert plug, insertable in the insert opening.

BRIEF DESCRIPTION OF THE DRAWINGS

FIG. 4 is a full end view showing the insert opening in the tang opening wall.
FIG. 5 is a full end view of the opposite end from the tang opening wall end.
FIG. 6 is a broken top view of two of the links coupled together.

DETAILED DESCRIPTION OF THE DRAWINGS

Figure 1:
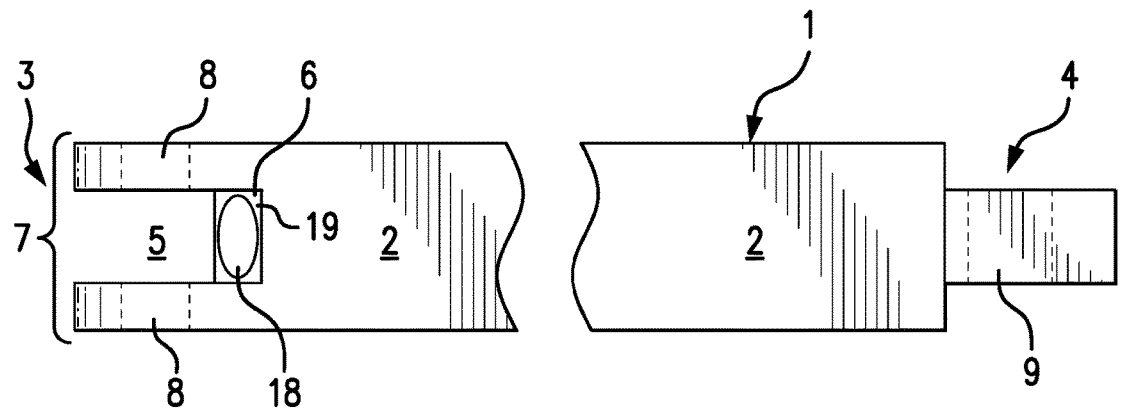
FIG. 1 is a broken top view of a link of this invention.

Turning now to a description of the drawings, and with reference to FIG. 1, there is shown a broken top view of a chain link 1 of this invention. It is to be understood that the broken illustrations used herein is a means of saving space in the drawings.

What is shown is a cross bar 2 having two ends, a first end 3 and a second end 4. Also shown is a tang opening 5 at the first end 3, a tang opening wall 6, a clevis configuration 7, through openings 8 in clevis configuration 7, and through opening 9 in second end 4. For purposes of this invention, the phrase "tang opening" means the open space between the prongs of the clevis and the "tang opening wall" means the back of the opening containing the plug insert opening.

The opening 9 can be cut off-center for purposes of this invention. In this manner, rotating the fixed position of the bushing 15 in the opening 9, will change the relative position of the center hole of the bushing 15, thus changing the distance between the link ends. (See the illustration in FIGS. 11 and 12).

Figure 2:
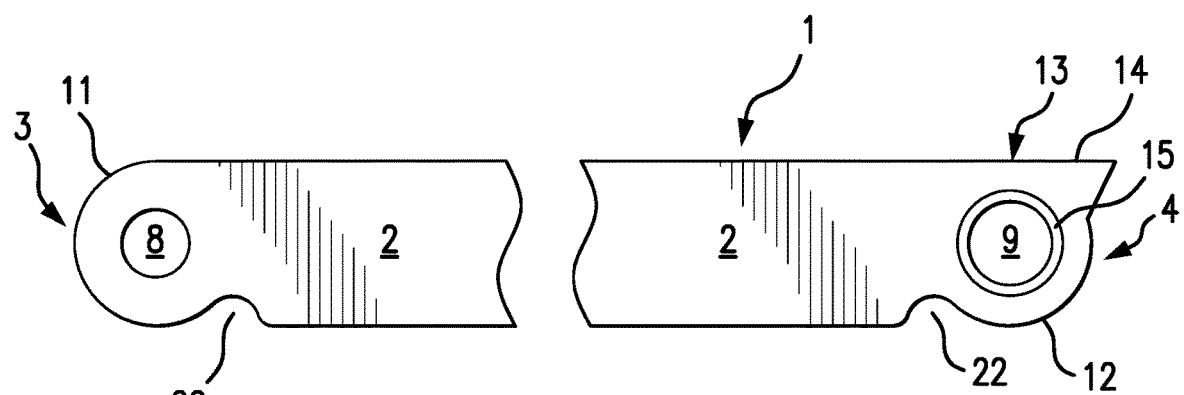
FIG. 2 is a broken side view of a link of this invention.

As shown in FIG. 2, the first end 3 is rounded 11 while second end 4 is partially rounded 12 and finishes on the upper side 13 with a prow 14. Also shown in FIG. 2 is a bushing 15 in through opening 9. The rounded end 11 or partially rounded ends 12 are needed to allow the chain link 1 to rotate at its ends when coupled with another like link.

Figure 3:
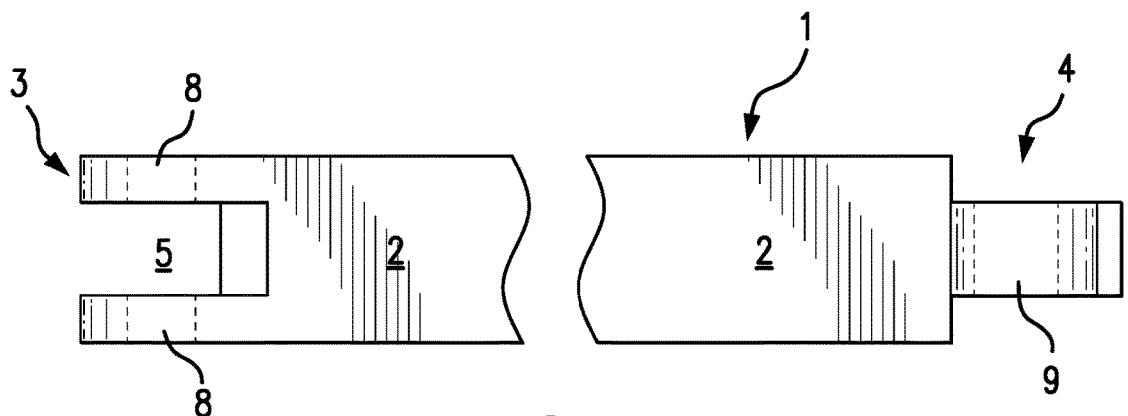
FIG. 3 is a broken bottom view of a link of this invention.
Figure 7:
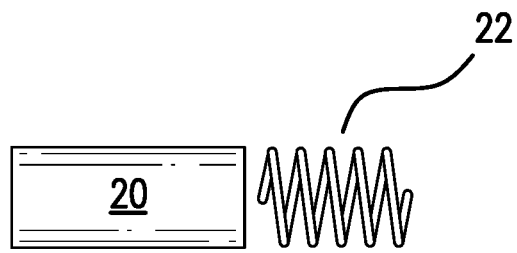
FIG. 7 is a full view of the plug insert and a spring.
Figure 9:
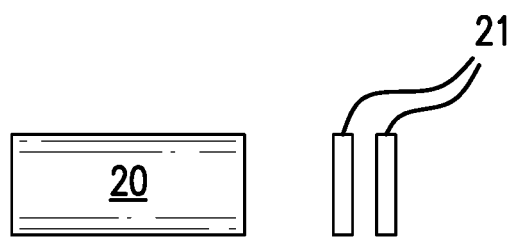
FIG. 9 is a full view of the plug and two shims used therewith.

As can be observed from FIGS. 1 and 3, second rounded end 4 is configured to fit in the clevis configuration 7 and a pin 16 (FIG. 6) is used to join the clevis 7 and the second end 4 together while allowing the ends to rotate around the pin 16. The pin 16 diameter can be changed for this invention. By changing the pin 16 diameter to a slightly smaller (0.010 to 0.020 inches) dimension, the link ends are allowed to move away from each other, changing the tab to tab (prow to tang opening wall surface) landing position, thus changing the relative angle of the links one to another.

Figure 8:
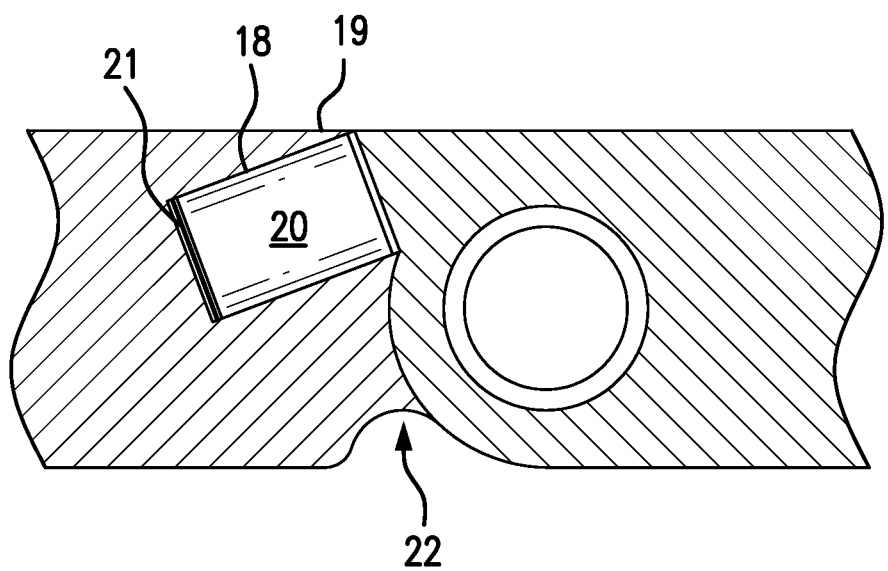
FIG. 8 is cross-sectional view through line A-A of FIG. 6.

In FIG. 1 it should be noted that the tang opening 5 has a wall 6 that is beveled on the order of 20 to 30° from the vertical and that there is an insert opening 18 in the beveled wall 28 (stop pad) at the upper end 19 thereof. (See also FIGS. 8 and 10).

Figure 10:
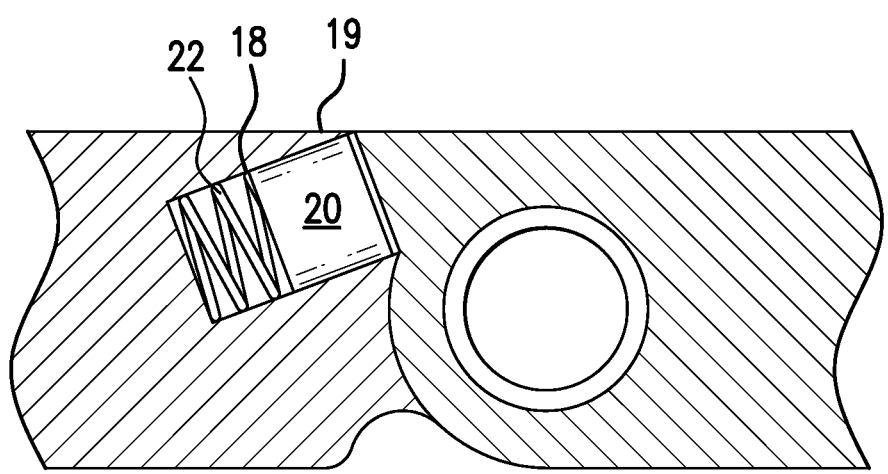
FIG. 10 is a cross-sectional view through line B-B of FIG. 6 wherein the shims have been replaced by a spring.

The tang opening 5 has inserted in it a plug 20 and either a shim or shims 21 (FIG. 8) or a spring 22 (FIG. 10). The plug 20 is typically manufactured from polyurethane or some such plastic and has a durometer of from 75A to 70D to provide the appropriate reflexive activity. Partially rounded end 4 has a prow 14 at its top end. This prow 14 interacts with the plug 20 of the opposite end of another chain link 1. This configuration is intended to provide an opportunity to change the reflexive pressure of one chain link against another when in use.

FIG. 4 shows a first end 3 of the chain link 1 with the plug 20. FIG. 5 is an end view of the second end 4 showing the partially rounded end 12 and the curvature 22 that is required to allow the two ends of the chain link 1 to rotate to a certain degree.

Figure 13:
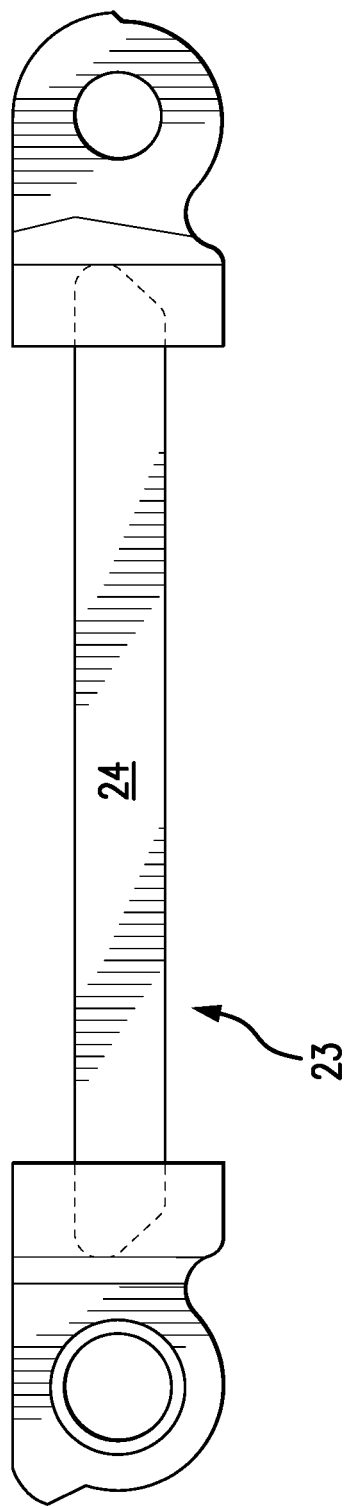
FIG. 13 is a full side view of a chain link of this invention with a spring bar replacing the rigid bar.

Turning now to the second embodiment of this invention, and with regard to FIG. 13, there is shown a chain link 23, which is essentially the chain link 1 of the first embodiment, wherein the metal bar 2 has been replaced with a steel spring 24. In all other aspects, this embodiment is the same as chain link 1.

Figure 14A:
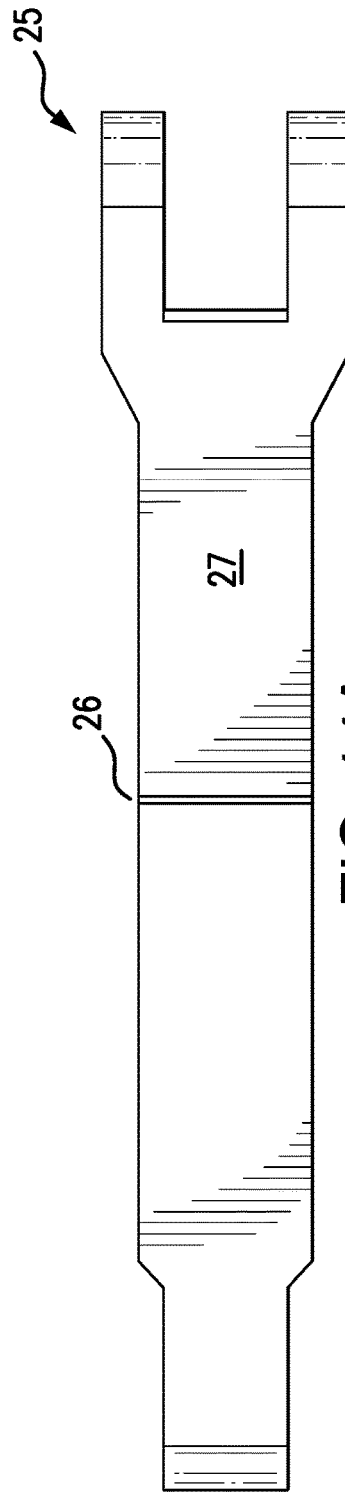
FIG. 14A is a full side view of a construction of a chain link that will allow flex in two directions.
Figure 14B:
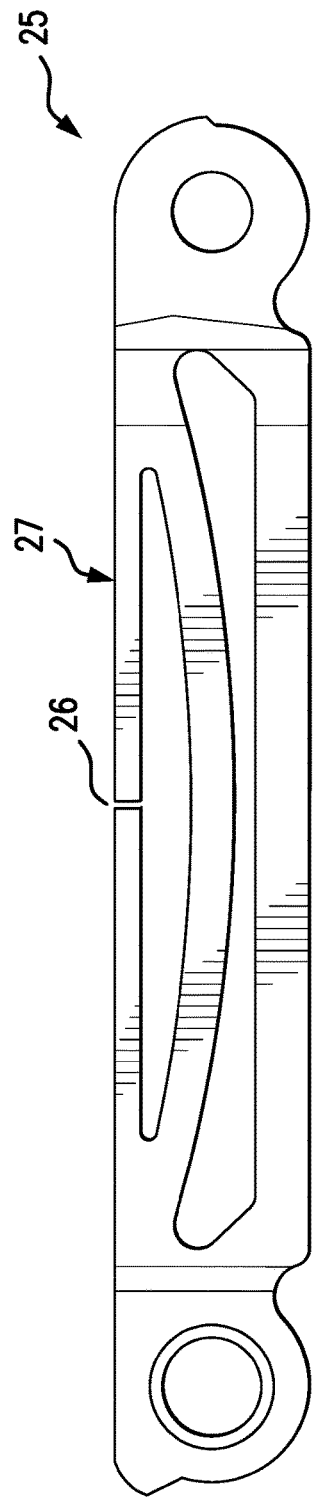
FIG. 14B is a full side view of the Figure of 14A unflexed.
Figure 14C:
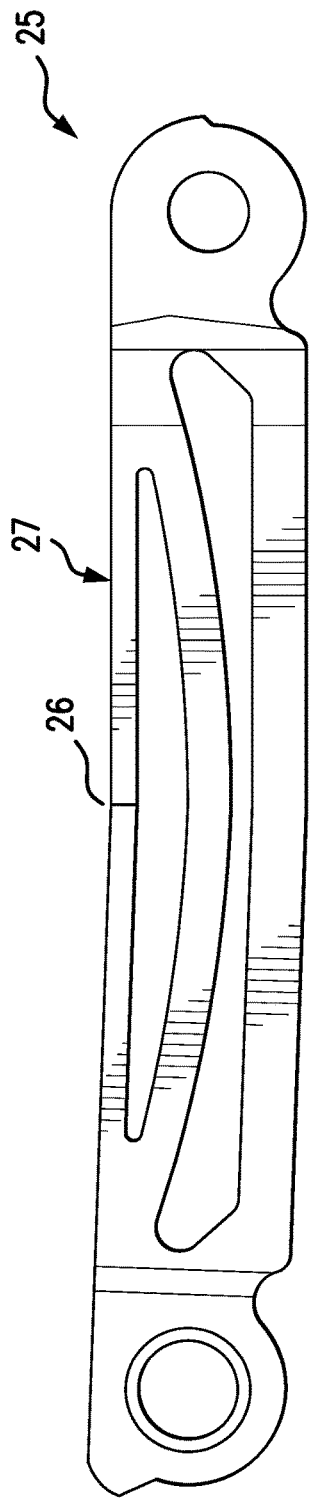
FIG. 14C is a full side view of the FIG. 14A flexed in the direction of the accompanying arrow.

Turning now to FIGS. 14A, 14B, 14C, there is shown a chain link 25 of this invention. FIG. 14A is a full top view of the chain link 25 showing a centered lateral slit 26 in the top 27 of the chain link 25. The width of the slit 26 is predetermined such that the flex of the chain link will only be to a certain desired degree.

FIG. 14B is a full side view of the chain link 25 in a non-flex state, and FIG. 14C is a full side view of the chain link of FIG. 14B after being flexed in the direction of the accompanying arrow. Upon flexure, the lateral slit closes to prevent an over flex. The chain link 25 is configured such that the link will flex in both directions. In one direction, it will flex unrestricted. In the other direction, with a load applied, it will flex up to 4 degrees past parallel using the polyurethane plug as a load bearing spring. The plug is described in detail Supra. In all other aspects, this embodiment is the same as chain link 1.

Figure 11:
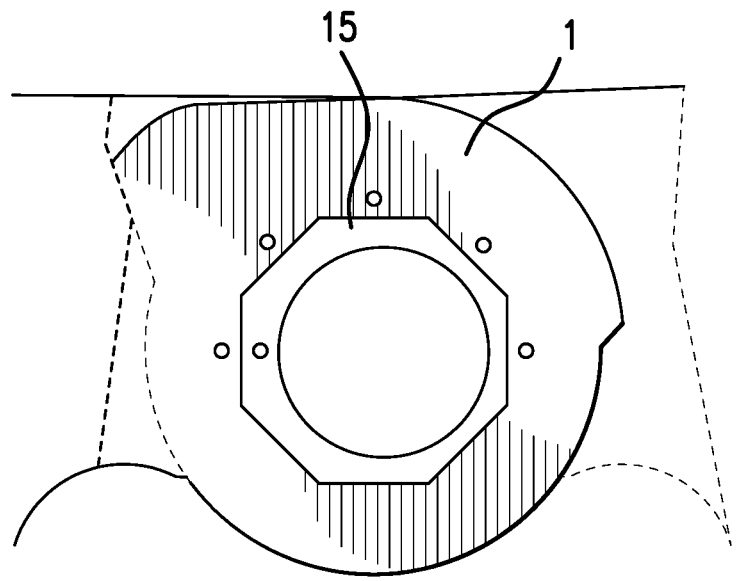
FIG. 11 is an illustration of a bushing in a bore having the capability of being turned in order to change the position of the busing in the bore.
Figure 12:
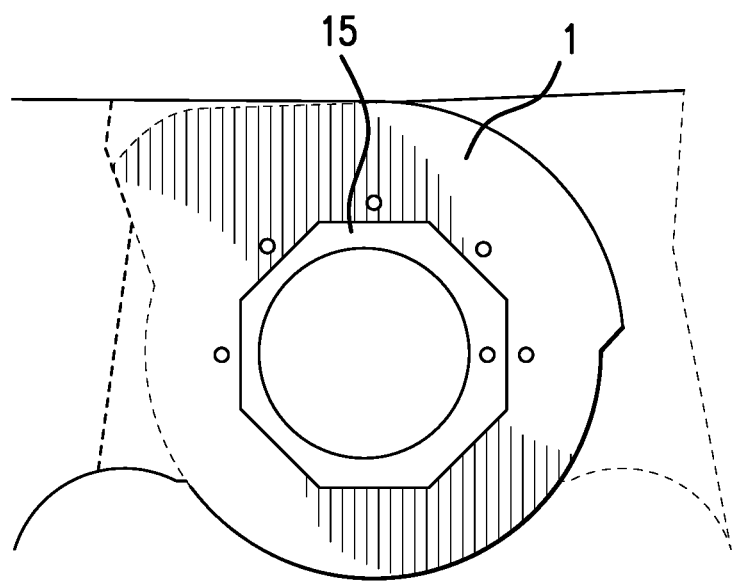
FIG. 12 is an illustration of the illustration of FIG. 11 after the bushing has been turned in the bore.

With regard to FIG. 11, there is shown an illustration of a bushing 15 in a bore having the capability of being turned in order to change the position of the bushing in the bore. Thus, there is shown an end of a chain link 1 of this invention in which the link pin rides in a bushing 15 that has an octagon shaped exterior and a round bore that is offset from the center. Repositioning the octagon shaped bushing 15 in the octagon shaped bore in the link end changes the relative positions of the two link ends by moving the stop pads 28 farther apart or closer together as desired. This changes the relative angle of the two links by allowing a second link to rotate more or less relative to a first link before the stop pads 28 make contact. The octagon shape allows for four positions in this illustration. It is contemplated within the scope of this invention to have less or more sides that would allow for less or more position selections. FIG. 12 is an illustration of the illustration of FIG. 11 after the bushing has been turned in the bore. The bore insertions are press fitted into place.

What is claimed is:

1. A chain link, said chain link comprising:
   a unitary metal bar having a top, a first end, a second end, a tang space, and a center point;
   said chain link first end being a clevis, said clevis having a through opening through the prongs of said clevis of predetermined size;
   said tang opening having a back wall, said back wall being beveled and having an insert opening therein;
   said chain link second end having a centered prong, said centered prong having a predetermined second through opening therein, said centered prong being configured to fit a clevis first end on an adjoining chain link;
   said chain link second end having an integrally mounted prow at a terminating end thereof;
   an insert plug, insertable in said insert opening.

2. A chain link as claimed in claim 1 wherein said insert opening has, in addition, at least one shim therein.

3. A chain link as claimed in claim 1 wherein said insert opening has, in addition, a spring inserted therein.

4. A chain link as claimed in claim 1 wherein said chain link is manufactured from metal.

5. A chain link as claimed in claim 4 wherein the metal is steel.

6. A chain link as claimed in claim 5 wherein the steel is 316 steel.

7. In combination, two chain links as claimed in claim 1, fastened together by a pin, said pin simultaneously insertable through said clevis prong openings in a first chain link and said second through opening of said chain link second end.

8. A combination as claimed in claim 7 wherein, in addition, there is a bushing in said chain link second end.

9. A combination as claimed in claim 8, wherein the bushing is an offset bushing.

10. A one way flex chain link, said one way flex chain link comprising:
    a unitary metal bar having a top, a first end, a second end, a tang space, a center point, and at least one elongated opening through a side of said unitary metal bar;
    said chain link first end being a clevis, said clevis having a through opening through the prongs of said clevis of predetermined size;
    said tang opening having a back wall, said back wall being beveled and having an insert opening therein;
    said chain link second end having a centered prong, said centered prong having a predetermined second through opening therein, said centered prong being configured to fit a clevis first end on an adjoining chain link;
    said chain link second end having an integrally mounted prow at a terminating end thereof;
    an insert plug, insertable in said insert opening;
    a lateral slit in said top of said unitary metal bar, from said top through into said elongated opening in said side of said unitary metal bar.

11. A chain link as claimed in claim 10 wherein said insert opening has, in addition, at least one shim therein.

12. A chain link as claimed in claim 10 wherein said insert opening has, in addition, a spring inserted therein.

13. A chain link as claimed in claim 10 wherein said chain link is manufactured from metal.

14. A chain link as claimed in claim 13 wherein the metal is steel.

15. In combination, two chain links as claimed in claim 10, fastened together by a pin, said pin simultaneously insertable through said clevis prong openings in a first chain link and said second through opening of said chain link second end.

16. A combination as claimed in claim 15 wherein, in addition, there is a bushing in said chain link second end.

17. A combination as claimed in claim 16, wherein the bushing is an offset bushing.

18. A two way flex chain link, said two way flex chain link comprising:
 a unitary metal bar being a replaceable spring member flexible in two directions, having a top, a first end, a second end, a tang space, a center point;
 said chain link first end being a clevis, said clevis having a through opening through the prongs of said clevis of predetermined size;
 said tang opening having a back wall, said back wall being beveled and having an insert opening therein;
 said chain link second end having a centered prong, said centered prong having a predetermined second through opening therein, said centered prong being configured to fit a clevis first end on an adjoining chain link;
 said chain link second end having an integrally mounted prow at a terminating end thereof;
 an insert plug, insertable in said insert opening.

19. A chain link as claimed in claim 18 wherein said insert opening has, in addition, at least one shim therein.

20. A chain link as claimed in claim 18 wherein said insert opening has, in addition, a spring inserted therein.

21. In combination, two chain links as claimed in claim 18, fastened together by a pin, said pin simultaneously insertable through said clevis prong openings in a first chain link and said second through opening of said chain link second end.

22. A combination as claimed in claim 18 wherein, in addition, there is a bushing in said chain link second ends.

23. A combination as claimed in claim 22, wherein the bushing is an offset bushing.

24. A chain link as claimed in claim 18 wherein said chain link is manufactured from metal.

25. A chain link as claimed in claim 24 wherein the metal is steel.

26. A method of controlling bending in a chain link, the method comprising manufacturing a chain link wherein there is:
 a unitary metal bar having a top, a first end, a second end, a tang space, and a center point;
 said chain link first end being a clevis, said clevis having a through opening through the prongs of said clevis of predetermined size;
 said tang opening having a back wall, said back wall being beveled and having an insert opening therein;
 said chain link second end having a centered prong, said centered prong having a predetermined second through opening therein, said centered prong being configured to fit a clevis first end on an adjoining chain link; said chain link second end having an integrally mounted prow at a terminating end thereof;
 an insert plug, insertable in said insert opening.

27. A method of controlling bending in a chain link, the method comprising manufacturing a metal chain link wherein there is:
 a unitary metal bar having a top, a first end, a second end, a tang space, a center point, and at least one elongated opening through a side of said unitary metal bar;
 said chain link first end being a clevis, said clevis having a through opening through the prongs of said clevis of predetermined size;
 said tang opening having a back wall, said back wall being beveled and having an insert opening therein;
 said chain link second end having a centered prong, said centered prong having a predetermined second through opening therein, said centered prong being configured to fit a clevis first end on an adjoining chain link;
 said chain link second end having an integrally mounted prow at a terminating end thereof;
 an insert plug, insertable in said insert opening;
 a lateral slit in said top of said unitary metal bar, from said top through into said elongated opening in said side of said unitary metal bar.

28. A method of controlling bending in a chain link, the method comprising manufacturing a chain link wherein there is a two way flex chain link, said two way flex chain link comprising:
 a unitary metal bar being a replaceable spring member flexible in two directions, having a top, a first end, a second end, a tang space, a center point;
 said chain link first end being a clevis, said clevis having a through opening through the prongs of said clevis of predetermined size;
 said tang opening having a back wall, said back wall being beveled and having an insert opening therein;
 said chain link second end having a centered prong, said centered prong having a predetermined second through opening therein, said centered prong being configured to fit a clevis first end on an adjoining chain link;
 said chain link second end having an integrally mounted prow at a terminating end thereof;
 an insert plug, insertable in said insert opening.

* * * * *